(12) United States Patent
Sun et al.

(10) Patent No.: US 11,005,617 B2
(45) Date of Patent: **\*May 11, 2021**

(54) SYSTEMS AND METHODS FOR CROSS-CHANNEL SCHEDULING OF HIGH EFFICIENCY (HE) MULTI-USER (MU) FRAME TRANSMISSION

(71) Applicant: Marvell Asia Pte. Ltd., Singapore (SG)

(72) Inventors: Yakun Sun, San Jose, CA (US);
Hongyuan Zhang, Fremont, CA (US);
Lei Wang, San Diego, CA (US)

(73) Assignee: Marvell Asia Pte, Ltd., Singapore (SG)

( \* ) Notice: Subject to any disclaimer, the term of this patent is extended or adjusted under 35 U.S.C. 154(b) by 0 days.

This patent is subject to a terminal disclaimer.

(21) Appl. No.: 16/226,177

(22) Filed: Dec. 19, 2018

(65) Prior Publication Data

US 2019/0273589 A1    Sep. 5, 2019

Related U.S. Application Data

(63) Continuation of application No. 15/262,905, filed on Sep. 12, 2016, now Pat. No. 10,164,745.

(Continued)

(51) Int. Cl.
*H04L 5/00* (2006.01)
*H04W 72/04* (2009.01)
*H04W 28/08* (2009.01)

(52) U.S. Cl.
CPC ....... *H04L 5/0044* (2013.01); *H04W 72/0453* (2013.01); *H04W 72/0486* (2013.01); *H04W 28/085* (2013.01)

(58) Field of Classification Search
CPC .................. H04W 72/0486; H04L 5/0044
See application file for complete search history.

(56) References Cited

U.S. PATENT DOCUMENTS

2012/0120931 A1    5/2012  Abraham et al.
2014/0307650 A1   10/2014  Vermani et al.
(Continued)

OTHER PUBLICATIONS

International Preliminary Report on Patentability for International Application No. PCT/US2016/058466 dated Mar. 13, 2018.
(Continued)

*Primary Examiner* — Yemane Mesfin
*Assistant Examiner* — Henry Baron

(57) ABSTRACT

Embodiments described herein provide a method for cross-channel scheduling of high efficiency (HE) multi-user (MU) frame transmission. In some embodiments, channel information and client station information may be obtained for data transmission. An MU frame containing a data field of a first type and two data fields of a second type may be configured to carry scheduling information relating to one or more channels for the data transmission. It may be determined that a current scheduling setting of the two data fields of the second type leads to unbalanced payload between the one or more channels. The two data fields of the second type may then be adjusted for a balanced channel mapping, and the data field of the first type may be adjusted to reflect the balanced channel mapping. Data based on the adjusted data field of the first type and the adjusted two data fields of the second type may be transmitted via the one or more channels.

16 Claims, 5 Drawing Sheets

Related U.S. Application Data

(60) Provisional application No. 62/246,319, filed on Oct. 26, 2015, provisional application No. 62/233,823, filed on Sep. 28, 2015, provisional application No. 62/216,547, filed on Sep. 10, 2015.

(56) References Cited

U.S. PATENT DOCUMENTS

2014/0369276 A1* 12/2014 Porat ................. H04L 5/003
　　　　　　　　　　　　　　　　　　　　　　　370/329
2017/0070998 A1* 3/2017 Wu ................. H04L 5/0023

OTHER PUBLICATIONS

International Search Report and Written Opinion dated Mar. 27, 2017 for PCT/US2016/058466, filed Sep. 12, 2016.

\* cited by examiner

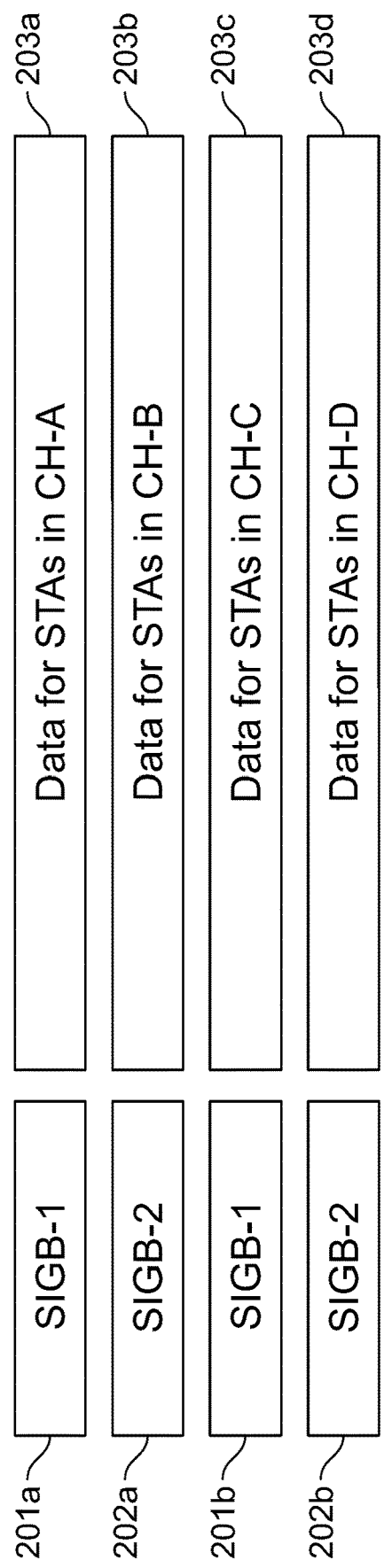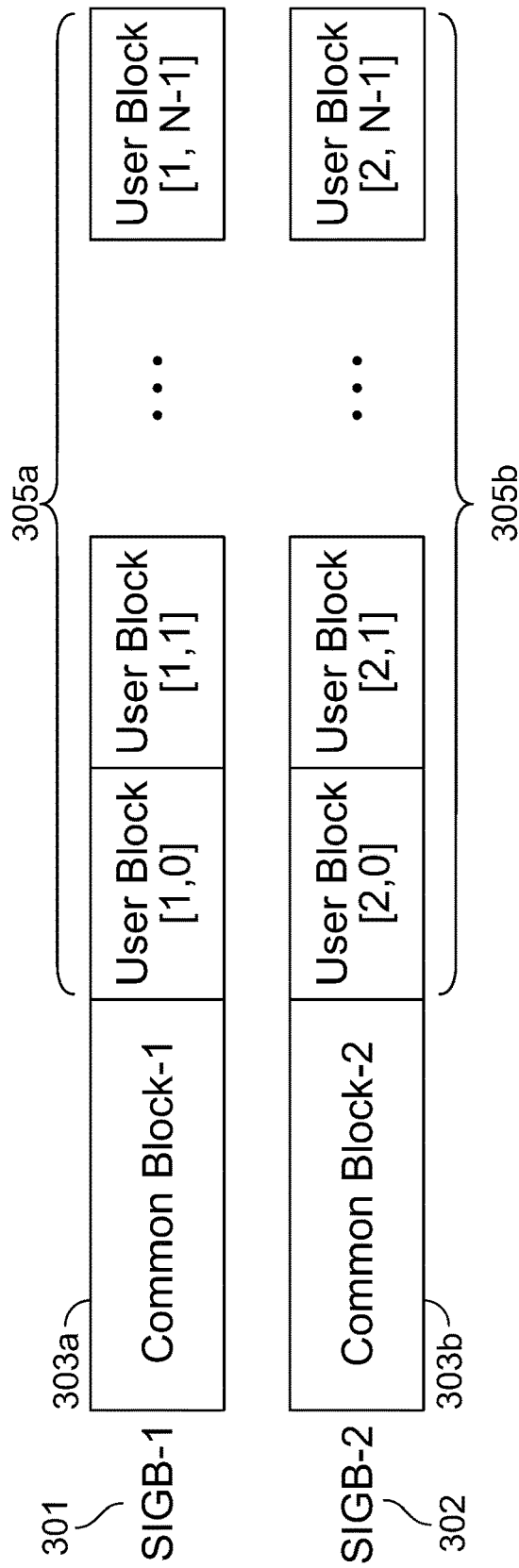
FIG. 2
FIG. 3

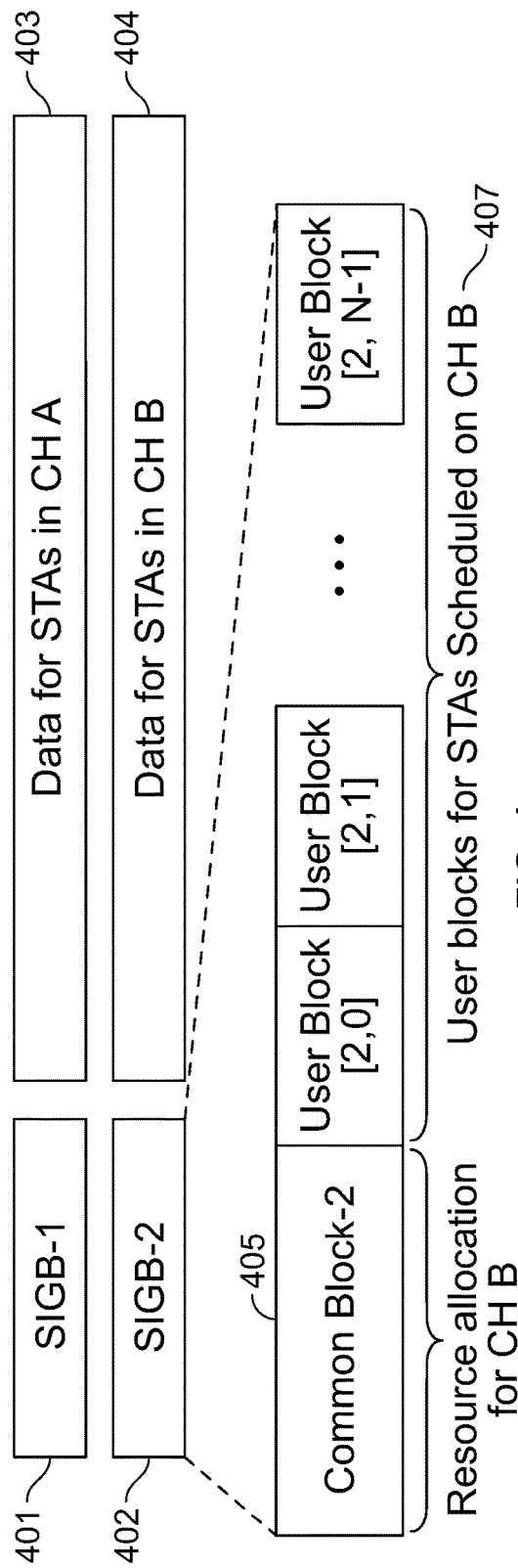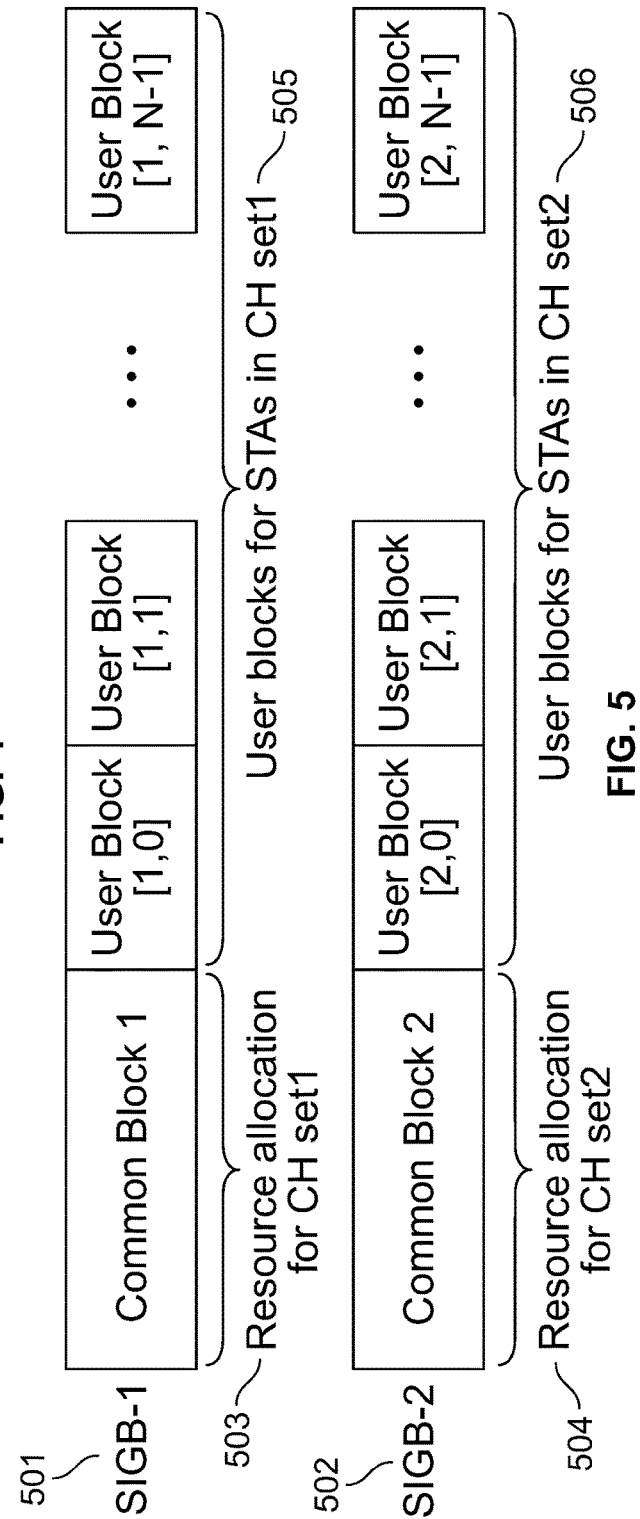
FIG. 4
FIG. 5

SYSTEMS AND METHODS FOR CROSS-CHANNEL SCHEDULING OF HIGH EFFICIENCY (HE) MULTI-USER (MU) FRAME TRANSMISSION

CROSS-REFERENCE TO RELATED APPLICATION

This disclosure is a continuation of U.S. patent application Ser. No. 15/262,905, filed Sep. 12, 2016 (now allowed), which in turn claims the benefit of U.S. Provisional Patent Application No. 62/216,547, filed Sep. 10, 2015; U.S. Provisional Patent Application No. 62/233,823, filed Sep. 28, 2015; and U.S. Provisional Patent Application No. 62/246,319, filed Oct. 26, 2015.

This application is related to PCT International Application No. PCT/US2016/051333, filed on Sep. 12, 2016. The aforementioned applications are all hereby incorporated by reference herein in their entireties.

FIELD OF USE

This disclosure relates to a multi-user (MU) data transmission scheduling scheme in a wireless data transmission system; for example, a wireless local area network (WLAN) implementing the IEEE 802.11 standard, which can be used to provide wireless transfer of data in outdoor deployments, outdoor-to-indoor communications, and device-to-device (P2P) networks.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

When operating in an infrastructure mode, wireless local area networks (WLANs) typically include an access point (AP) and one or more client stations. These WLANs operate in either a unicast mode or a multicast mode. In the unicast mode, the AP transmits information to one client station at a time. In the multicast mode, the same information is concurrently transmitted to a group of client stations. Development of WLAN standards such as the Institute for Electrical and Electronics Engineers (IEEE) 802.11a, 802.11b, 802.11g, and 802.11n Standards has improved data throughput by allowing transmitting across frequency bandwidth. Thus, a scheduling mechanism is needed to schedule data frames transmitted between the AP and multiple client stations. For example, the AP and/or the client station needs to know which channel a data frame is being transmitted, how much bandwidth out of a channel is allocated to a specific user, and/or the like.

SUMMARY

Embodiments described herein provide a method for cross-channel scheduling of high efficiency (HE) multi-user (MU) frame transmission. In some embodiments, channel information and client station information may be obtained for data transmission. An MU frame containing a data field of a first type and two data fields of a second type may be configured to carry scheduling information relating to one or more channels for the data transmission. It may be determined that a current scheduling setting of the two data fields of the second type leads to unbalanced payload between the one or more channels. The two data fields of the second type may then be adjusted for a balanced channel mapping, and the data field of the first type may be adjusted to reflect the balanced channel mapping. Data based on the adjusted data field of the first type and the adjusted two data fields of the second type may be transmitted via the one or more channels.

In some implementations, a first data field of the two data fields of the second type covers a first set of channels from the one or more channels, and a second data field of the two data fields of the second type covers a second set of channels from the one or more channels.

In some implementations, each of the two data fields of the second type contains resource allocation information relating to one or more client stations on a channel that the respective data field of the second type covers.

In some implementations, the data field of the first type contains mapping information between the two data fields of the second type and the one or more channels.

In some implementations, the two data fields of the second type for a balanced channel mapping may be adjusted by moving a first channel from the first set to the second set.

In some implementations, the two data fields of the second type for a balanced channel mapping may be adjusted by swapping a first channel from the first set with a second channel from the second set.

In some implementations, the data field of the first type to reflect the balanced channel mapping may be adjusted by designating a plurality of bits in the data field of the first type to represent a changing pattern from the current scheduling setting.

In some implementations, the plurality of bits includes a channel bitmap.

In some implementations, a previously stored data table that maps the plurality of bits to channel mapping patterns may be retrieved.

In some implementations, the transmitted data includes a new MU frame that contains the adjusted data field of the first type and the adjusted two data fields of the second type, and the new MU frame is decoded at a receiver for the receiver to obtain channel mapping information and resource allocation information from the adjusted data field of the first type and the adjusted two data fields of the second type.

Some embodiments described herein provide a system for cross-channel scheduling of high efficiency (HE) multi-user (MU) frame transmission. The system includes a processing circuitry. The processing circuitry is configured to obtain channel information and client station information for data transmission, and configure an MU frame containing a data field of a first type and two data fields of a second type to carry scheduling information relating to one or more channels for the data transmission. The processing circuitry is further configured to determine that a current scheduling setting of the two data fields of the second type leads to unbalanced payload between the one or more channels, adjust the two data fields of the second type for a balanced channel mapping, and adjust the data field of the first type to reflect the balanced channel mapping. The system further includes a network interface to transmit, via the one or more channels, data based on the adjusted data field of the first type and the adjusted two data fields of the second type.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which:

FIG. 2 provides an example block diagram illustrating an example MU frame at 80 MHz, according to some embodiments described herein;

FIG. 3 provides an example block diagram illustrating exemplary data information carried by two SIGB fields, according to some embodiments described herein;

FIG. 4 provides an example block diagram illustrating an exemplary SIGB and station mapping scheme for a bandwidth of 40 MHz, according to some embodiments described herein;

FIG. 5 provides an example block diagram illustrating an exemplary SIGB and station mapping scheme for data transmission at a bandwidth greater than 40 MHz, according to some embodiments described herein;

DETAILED DESCRIPTION

This disclosure describes methods and systems for a cross-channel scheduling mechanism for transmitting HE MU frames within an 802.11 wireless network. In some embodiments, a wireless network device such as an access point (AP) of a wireless local area network (WLAN) simultaneously transmits data to multiple client stations and/or receives data simultaneously transmitted by multiple client stations. Such data includes header information that provides the channel scheduling information (e.g., which channels are covered by which data fields, etc.) and resource allocation information (e.g., how bandwidth of a channel is shared among client stations transmitting on the respective channel, etc.). The header information may signal the schedule information in a specific data field such that, upon decoding header information at a receiver, the receiver (e.g., either the AP or a client station) obtains configuration information of the subsequently transmitted payload data.

Figure 1:
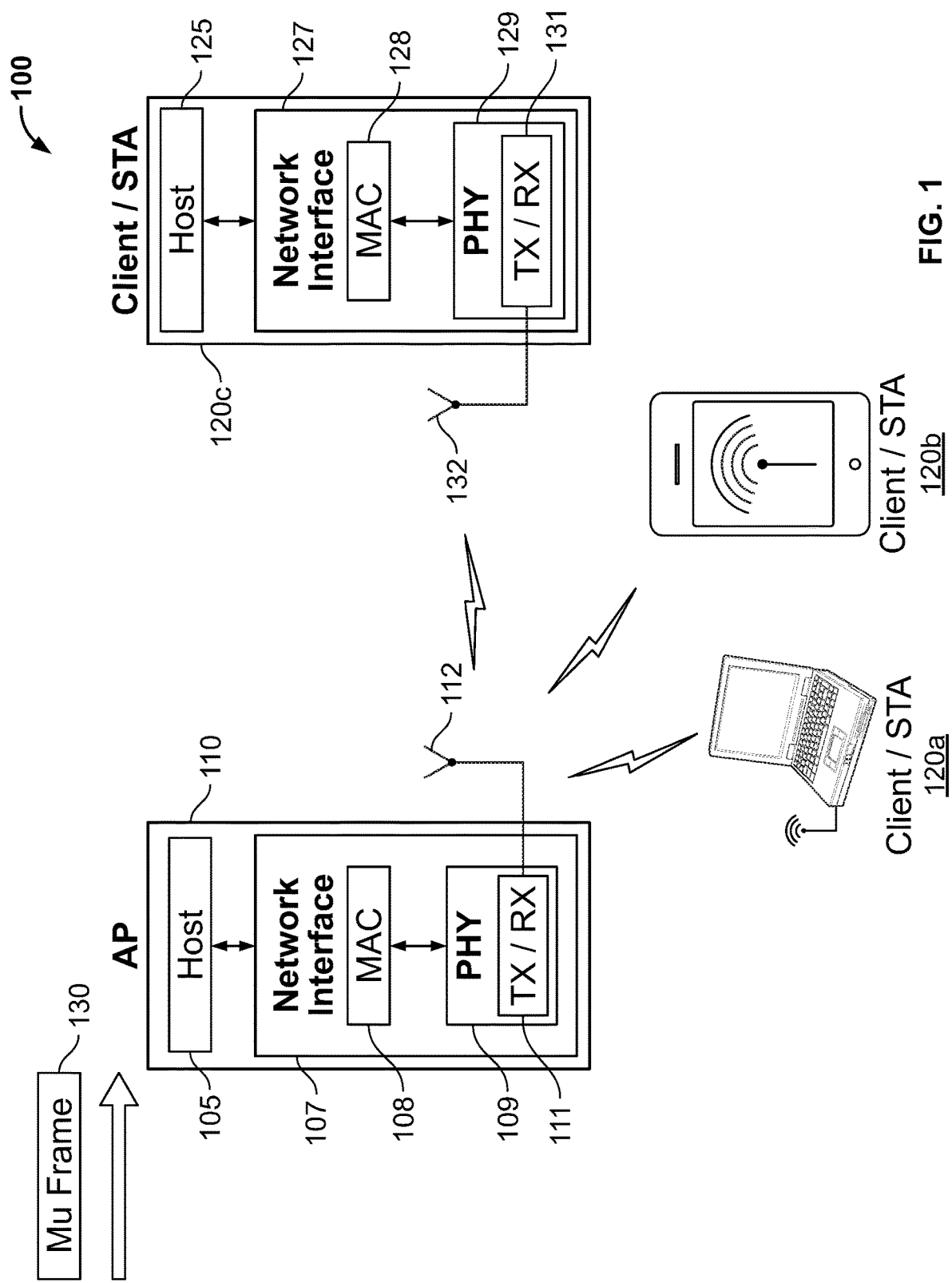
FIG. 1 is a block diagram of an example wireless local area network (WLAN) 100 that the cross-channel scheduling for MU frames can be operated within, according to some embodiments described herein.

FIG. 1 is a block diagram of an example wireless WLAN 100 that the cross-channel scheduling for MU frames can be operated within, according to some embodiments described herein. A wireless access point 110 (AP) includes a host processor 105 that may be configured to process or assist in data operation, such as encoding/decoding, encryption/decryption, and/or the like. A network interface device 107 is coupled to the host processor 105, which is configured to interface with an outer network. The network interface device 107 includes a medium access control (MAC) processing unit 108 and a physical layer (PHY) processing unit 109. The PHY processing unit 109 includes a plurality of transceivers 111, and the transceivers 111 are coupled to a plurality of antennas 112.

The WLAN 100 includes a plurality of client stations 120*a-c*. Although three client stations 120*a-c* are illustrated in FIG. 1, the WLAN 100 can include different numbers (e.g., 1, 2, 3, 5, 6, etc.) of client stations 120*a-c* in various scenarios and embodiments. Each client station, e.g., 120*a-c*, may have a similar structure as that of an AP 110. For example, the client station 120*c* can include a host processor 125 coupled to a network interface device 127. The network interface device 127 includes a MAC processing unit 128 and a PHY processing unit 129. The PHY processing unit 129 includes a plurality of transceivers 131, and the transceivers 131 are coupled to a plurality of antennas 132 to receive or transmit data from or to the wireless communication channel.

Two or more of the client stations 120*a-c* may be configured to receive data, such as an 802.11ax multi-user (MU) frame 130, that are transmitted simultaneously by the AP 110. Additionally, two or more of the client stations 120*a-c* can be configured to transmit data to the AP 110 such that the AP 110 receives the data. For example, different client stations 120*a-c* may share available bandwidth and/or communication channels to communicate with the AP 110. Thus, the header information of data frames being transmitted (e.g., the MU frame 130) will contain scheduling information (e.g., which channel to use to transmit data to a specific client, etc.), resource allocation information (e.g., how much bandwidth of the channel is allocated to data transmission to a specific client, etc.), and/or the like. The AP 110, or reversely the client station 120*c*, may thus decode (e.g., via the host processor 105 or 125, respectively) a received data packet to retrieve the scheduling/resource allocation information such that the data payload can be received accordingly, e.g., from which channel data from a specific user is expected, etc. In some implementations, transmissions from multiple client stations 120*a-c* may be scheduled across the frequency bandwidth and/or spatial domain in the 802.11ax MU frame. An example data structure of the MU frame is illustrated in FIG. 2.

FIG. 2 provides an example block diagram illustrating an example MU frame at 80 MHz, according to some embodiments described herein. The MU frame may include a high efficiency (HE) preamble portion containing an HE signal field A (SIGA) and an HE signal field B (HE-SIGB). Specifically, the SIGB is used to signal the resource unit (RU) signaling and physical layer (PHY) configuration for each station. For example, at more than 20 MHz, two SIGBs can be constructed and each carries different scheduling information. The two SIGBs, e.g., SIGB-1 and SIGB-2, can each be transmitted at a frequency of over 20 MHz, and may be duplicated over other channels at 20 MHz. As shown in FIG. 2, the field SIGB-1 201*a* can include scheduling information for data for stations on channel A (203*a*), and another field SIGB-2 202*a* can include scheduling information for data for stations on channel B (203*b*). The fields SIGB-1 and SIGB-2 can be duplicated (201*b* and 202*b*) for scheduling information for data for stations on additional channels, such as channels C and D (203*c-d*), respectively.

FIG. 3 provides an example block diagram illustrating exemplary data information carried by two SIGB fields, according to some embodiments described herein. Each SIGB 301 or 302 may include a not-fully-duplicated common block 303*a* or 303*b*, respectively, e.g., the common block 303*a* or 303*b* may each carry RU signaling (resource allocation) information for the channels that the respective SIGB covers. For example, if SIGB-1 301 covers information for channel A and SIGB-2 302 covers information for channel B, common block 303*a* may carry RU signaling information for channel A (e.g., if there are two client stations on channel A, each may be allocated to 10 MHz), and common block 303*b* may carry RU signaling information for channel B (e.g., if there are two client stations on channel B, one may be allocated 5 MHz and the other may be allocated 15 MHz, etc.). The user blocks 305*a* and 305*b* may carry PHY configuration information for each scheduled station that chooses the respective SIGB to carry its information. Thus, a scheduling mechanism that adopts the two SIGBs needs to provide a SIGB and station mapping scheme that identifies whose information is to be carried in which SIGB.

FIG. 4 provides an example block diagram illustrating an exemplary SIGB and station mapping scheme for a bandwidth of 40 MHz, according to some embodiments described herein. The fields SIGB-1 401 and SIGB-2 402 may each cover a 20 MHz channel, e.g., SIGB-1 401 carries scheduling information relating to transmitting data 403 for stations on channel A, and SIGB-2 402 carries information relating to transmitting data 404 for stations on channel B. Each SIGB 401 or 402 contains a common block 405 including resource allocation information for the respective channel the SIGB is transmitted on, e.g., SIGB-1 401 includes a common block storing information for channel A, and SIGB-2 402 includes a common block storing information for channel B. Each common block 405 is followed by the associated user blocks 407 that include user data transmitted to/from the multiple stations on the respective channel.

FIG. 5 provides an example block diagram illustrating an exemplary SIGB and station mapping scheme for data transmission at a bandwidth greater than 40 MHz, according to some embodiments described herein. When two SIBGs 501 and 502 are used, each SIGB may cover a set of channels. For example, each SIGB 501 or 502 contains a common block 503 or 504 including RU signaling information for a set of a few channels, and the STAs scheduled on the respective set of channels may have their user blocks 505 or 506 also in the respective SIGB. In this way, a single SIGB may cover different channels, and thus cross-channel scheduling is realized via the data structure shown in FIG. 5. The channel-to-SIGB mapping is flexible, e.g., the SIGB-1 501 or SIGB-2 502 can be mapped to different channels. The numbers of channels covered by each SIGB 501 or 502 may not be necessarily the same, e.g., SIGB-1 501 may cover two channels, and SIGB-2 502 may cover four channels. The channel-SIGB mapping information may be signaled in the SIGA field.

Figure 6:
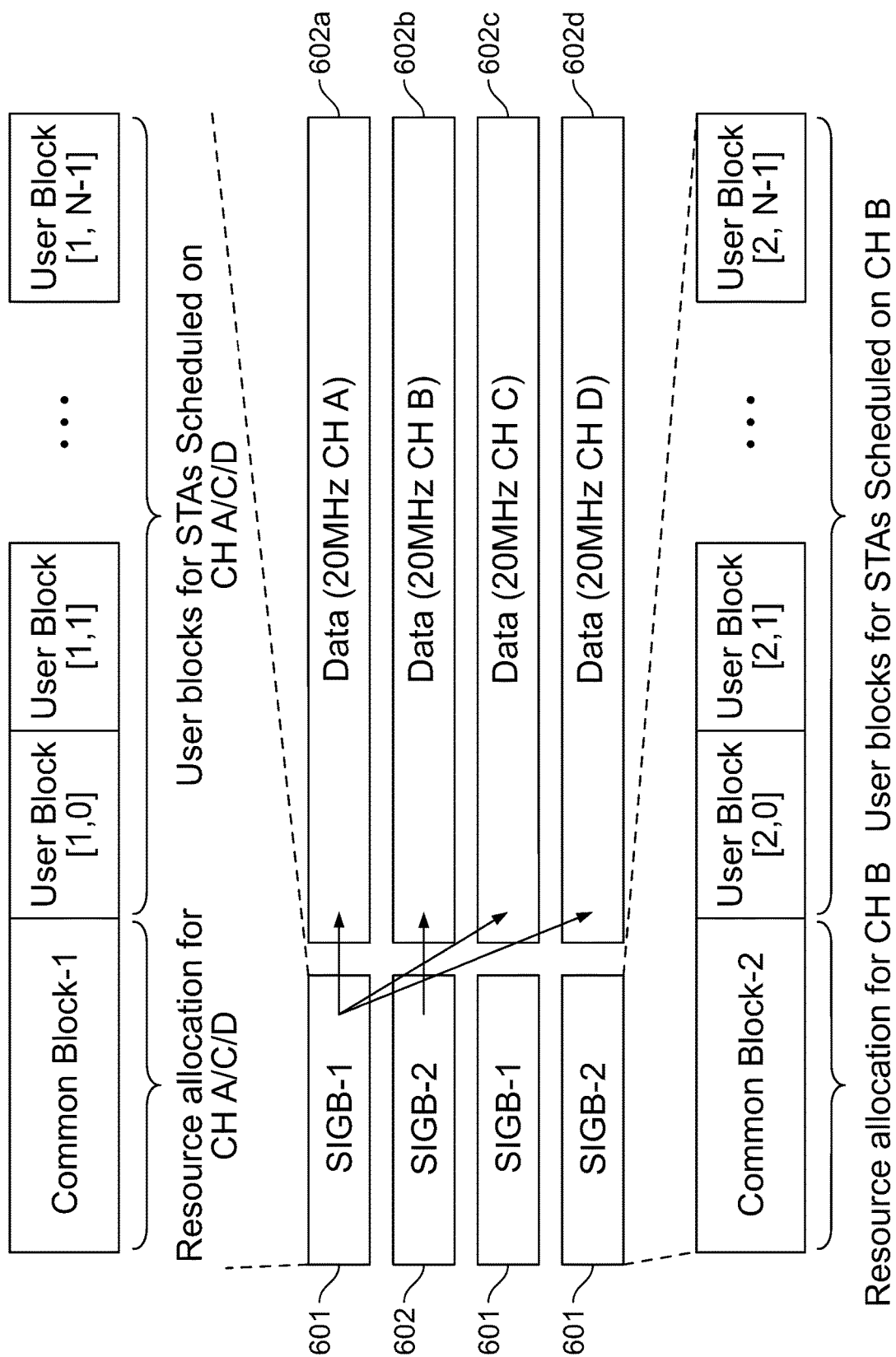
FIG. 6 provides an example block diagram illustrating an exemplary SIGB and station mapping scheme for data transmission at 80 MHz, according to some embodiments described herein.

FIG. 6 provides an example block diagram illustrating an exemplary SIGB and station mapping scheme for data transmission at 80 MHz, according to some embodiments described herein. In this example, four channels A, B, C and D of 20 MHz can be divided into two sets, e.g., SIGB-1 covers channel set 1={A, C, D}, and SIGB-2 covers channel set 2={B}. For example, when there are three users on channel B, and each of channels A, C and D only has one user, the grouping of {A, C, D} and {B} can have a balanced payload for each SIGB. Thus, while on PHY the data for channel D 602*d* is transmitted following a SIGB-2 601 (as SIGB-1 and SIGB-2 fields are transmitted or received alternatively in a sequence), resource allocation information for channel D is carried by SIGB-1 601, and thus the scheduling is cross-channel.

Figure 7:
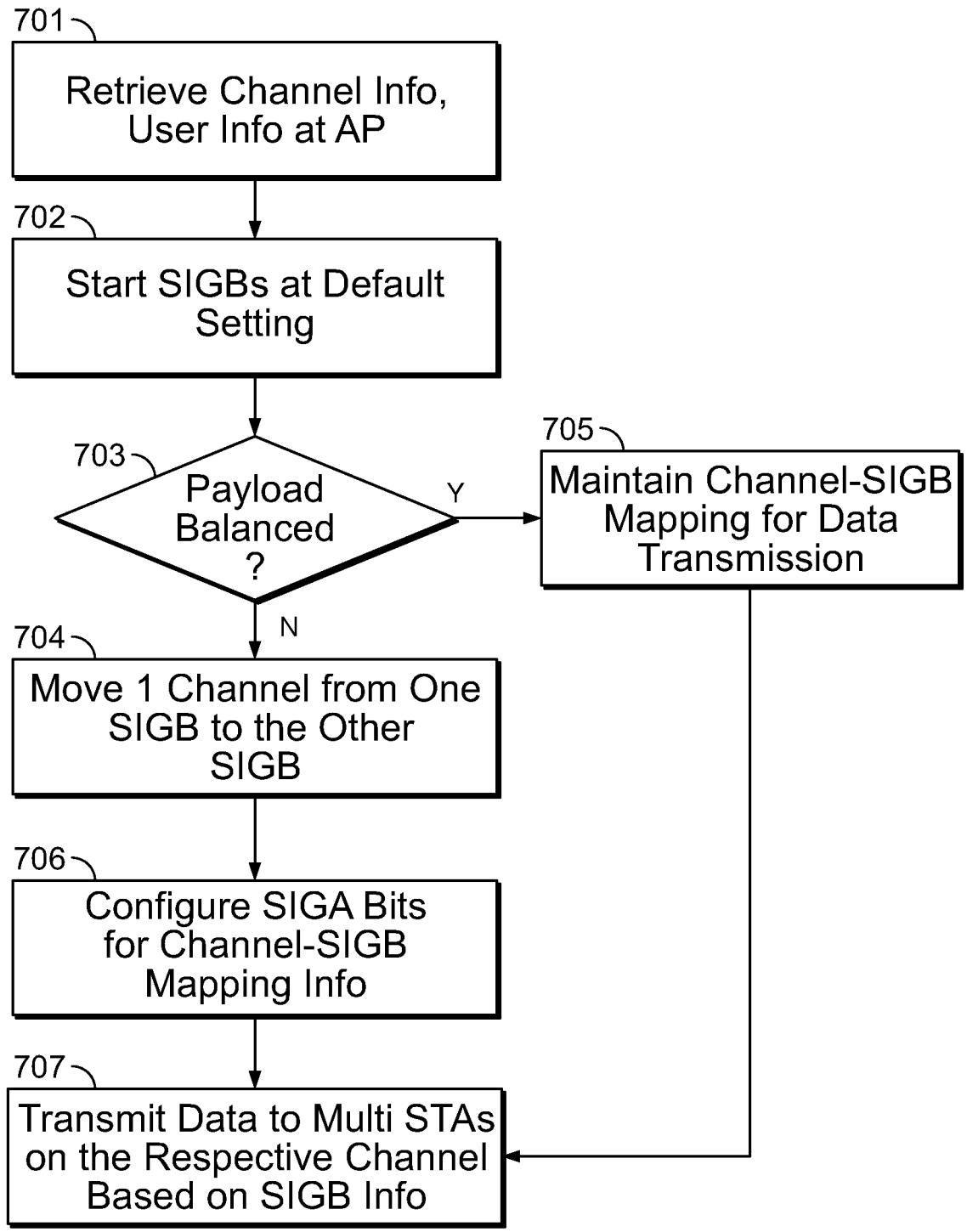
FIG. 7 provides a logic flow diagram illustrating aspects of cross-channel scheduling mapping and signaling, according to some embodiments described herein.

FIG. 7 provides a logic flow diagram illustrating aspects of cross-channel scheduling mapping and signaling, according to some embodiments described herein. At 702, the AP (e.g., 110 in FIG. 1) may retrieve channel information and user/client information such as the available bandwidth for data transmission (e.g., 20 MHz, 40 MHz, 80 MHz, or more, etc.), the number of available channels (e.g., two 20 MHz channels, four 20 MHz channels, etc.), the number of clients/stations for data transmission with the AP, client-channel mapping information, and/or the like. At 702, the AP may start SIGBs at a default setting, e.g., each SIGB covers the channel(s) in the same frequency. For example, for a bandwidth of 80 MHz with channels A, B, C and D (as shown in FIG. 6), SIGB channel set 1={A,C} and set 2={B, D}.

At 703, the AP may then determine, e.g., via the host processor 105 in FIG. 1, whether the payload for each SIGB is balanced. For example, if each channel A, B, C and D has two client/stations transmitting thereon, the data load for SIGB-1 and SIGB-2 may be similar, and thus the channel-SIGB mapping is considered balanced. In a different example, if channel A has five clients/stations, but each of the channels B, C and D has only one client/station, the SIGB that carries information for the channel set {A,C} may have an unbalanced higher data load compared to the other SIGB that carries information for the channel set {B,D}. Rebalancing of the channel-SIGB mapping may be performed.

When the channel-SIGB mapping is balanced at 703, the AP may maintain the current channel-SIGB (e.g., the default setting) mapping for data transmission at 705. Otherwise, the AP may re-map the channels to SIGB. For example, for a bandwidth of 80 MHz, the number of channels in each channel set covered by each SIGB can be {2, 2}, {1, 3}, {3, 1}. When rebalancing occurs, one channel may be moved from one SIGB to another SIGB, e.g., the channel sets can be moved from {A, C}, {B, D} to {A}, {B, C, D}.

The updated channel-SIGB mapping information may be configured in the SIGA bits, at 706. In one implementation, one signaling method can be: 2 bits (channel bitmap for two channels in each set)+1 bit (moving from SIGB-1 to SIGB-2 or from SIGB-2 to SIGB-1)=3 bits in SIGA. Here, any "1" in the bitmap indicates the corresponding channel to be mapped to another SIGB. For example, "10" represents that a first channel from the set is to be moved to the other set, and "01" represents that a second channel from the set is to be moved to the other set. A bitmap "00" means that the rebalance is off. In the above signaling methods for SIGA, the order of bits can be arbitrary as long as it is pre-defined.

In another implementation, the signaling method with SIGA can be 1 bit (which channel to be mapped)+1 bit (moving from SIGB-1 to SIGB-2 or from SIGB-2 to SIGB-1)+1 bit (cross-channel-scheduling on/off)=3 bits in SIGA. For example, when the default channel-SIGB mapping is SIGB-1 for {A, B}, and SIGB-2 for {C, D}, the 3 bits of "011" in SIGA may indicate that the second bit "1" represents a move from SIGB-2 to SIGB-1; the first bit "0" represents the first channel of the channel set to be moved from; and the third bit "1" represents that the cross-channel-scheduling is on. Then in this example, "011" means channel C is moved from set 2 to set 1 for cross-channel scheduling. In the above signaling methods for SIGA, the order of bits can be arbitrary as long as it is pre-defined.

In another example, for a bandwidth of 160 MHz with eight channels (labeled from A to H), the number of channels in channel set 1 and set 2 covered by each SIGB, respectively, can be {4, 4}, {3, 5}, {5, 3}, {2, 6}, {6, 2}, {1, 7}, {7, 1}. At 704, at most one channel is moved from one SIGB to another SIGB; thus, the numbers of channels in each channel set may change from the default {4, 4} to {4, 4}, {3, 5} or {5, 3}. Thus, one example signaling method in SIGA can be 1 bit (cross-channeling on/off)+2 bits (which channel of the four channels in each channel set to move)+1 bit (moving from SIGB-1 to SIGB-2 or from SIGB-2 to SIGB-1)=4 bits in SIGA. Another example signaling method in SIGA can be used when any channel in one SIGB can be moved to another SIGB: 4 bits (channel bitmap for four channels in each set)+1 bit (moving from SIGB-1 to SIGB-2 or from SIGB-2 to SIGB-1)=5 bits.

Alternatively, a codebook or table can be used to list the channel mapping. When there are additional channel sets not covered by moving channels from one SIGB to another based on the original default setting, an additional rebalancing method can be incorporated. For example, options with more than one channel to be moved can be added at 704. Or, options with channel swapping can be added.

For example, for a bandwidth of 80 MHz (four channels A, B, C, D), when only one channel can be moved from one SIGB to the other, and the first channel mapped to the one respective SIGB cannot be moved, the codebook/table can be constructed as shown in Table 1:

TABLE 1

Example Channel-SIGB Mapping Table for 80 MHz, 2 Bits

| B0B1 | CH-to-SIGB Map |
|---|---|
| 00 | AC/BD |
| 01 | AD/BC |
| 10 | AC<u>D</u>/B |
| 11 | A/BD<u>C</u> |

When B0B1=01, a channel swapping occurs to move from "00" to "01". "10" and "11" shows the scenarios when only one channel is moved from one SIGB to the other SIGB from "00" (the underlined channel is the channel that has been moved from another SIGB).

If three bits are used for 80 MHz, the codebook/table can be constructed as shown in Table 2:

TABLE 2

Example Channel-SIGB Mapping Table for 80 MHz, 3 Bits

| B0~B2 | CH-to-SIGB Map |
|---|---|
| 000 | AC/BD |
| 001 | AB/CD |
| 010 | AD/BC |
| 011 | ABC/D |
| 100 | ACD/B |
| 101 | A/BCD |
| 110 | rsvd |
| 111 | rsvd |

When three bits are used, all options of channel sets for 80 MHz can be included.

In another example, for a bandwidth of 160 MHz (eight channels A-H), when only one channel can be moved from one SIGB to the other, and the first channel mapped to the one respective SIGB cannot be moved, the codebook/table can be constructed as shown in Table 3:

TABLE 3

Example Channel-SIGB Mapping Table for 160 MHz, 3 Bits

| B0~B2 | CH-to-SIGB Map |
|---|---|
| 000 | ACEG/BDFH |
| 001 | ABCD/EFGH |
| 010 | ACEG<u>H</u>/BDF |
| 011 | ACEG<u>F</u>/BDH |
| 100 | ACEG<u>D</u>/BFH |
| 101 | AEG/BDFH<u>C</u> |

TABLE 3-continued

Example Channel-SIGB Mapping Table for 160 MHz, 3 Bits

| B0~B2 | CH-to-SIGB Map |
|---|---|
| 110 | ACG/BDFH<u>E</u> |
| 111 | ACE/BDFH<u>G</u> |

The underlined channels in Table 4 are the channels that have been moved from another SIGB.

Other alternative implementations for configuring SIGA bits for channel-SIGB mapping can be used at 706. In some implementations, the channel-SIGB mapping can be designed such that SIGB can cover all the channels. For example, the signaling in SIGA can include a bitmap of N bits, where N denotes the number of channels (e.g., four for 80 MHz, and eight for 160 MHz). A "1" in the bitmap in the corresponding channel belongs to one SIGB (e.g., "1" can be designated to denote SIGB-1, and "0" can be designated to denote SIGB-2; or vice versa), and the "0" indicates the corresponding channel belongs to the other SIGB. For example, for the four channels A, B, C, D, a four-bit string XXXX can be used in the bitmap, e.g., "0101" represents that channels A and C are carried by SIGB-2 and B and D are carried by SIGB-1; and "0001" represents channel A, B, C are carried by SIGB-2, and channel D is carried by SIGB-1, and/or the like.

Other signaling methods in SIGA at 706 can include designating a subfield in SIGA to indicate how many channels are covered by one SIGB. For example, 3 bits for 160 MHz (eight channels) to indicate how many channels are covered by SIGB-1, and implicitly the remaining channels are covered by SIGB-2. In addition, some special values of this subfield can be used to indicate the load balancing is on or off. For example, if the 3 bits=000, no load balancing is used. A channel identification subfield can be added in each SIGB's common block (e.g., common blocks 303*a* or 303*b* in FIG. 3). The identification subfield can include a K-bit channel index for each channel covered in this SIGB, where K is determined based on the number of channels (e.g., K=3 for 160 MHz, eight channels). Or alternatively, an M-bit bitmap to indicate which channel belongs to this SIGB, where M is equivalent to the number of channels for each SIGB at a default setting (e.g., M=2 for 80 MHz, M=4 for 160 MHz, etc.). In another example, when no identification subfield is used in the SIGA field, the channels in one SIGB can be assigned successively from a predefined order. For example, if three channels are covered by SIGB-1, then they are channels A-C from the four channels of 80 MHz. Or the channels can be alternatively assigned to each SIGB. Once one SIGB is filled (per the number of channels for each SIGB), the rest of the unassigned channels go to the unfilled SIGB. For example, if three channels are covered by SIGB-1, then channels A, C and E are covered by SIGB-1, and channels B, D, F, G and H go to SIGB-2.

At 707, the AP may transmit data to the multiple stations on the respective channel based on the SIGA and SIGB information. When the channel condition or client condition changes, e.g., available bandwidth changes or more clients are added for transmission, the AP may start at 701 for possible rebalancing of channel-SIGB mapping again.

While this specification contains many specifics, these should not be construed as limitations on the scope of what may be claimed, but, rather, as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

While operations are depicted in the drawings in a particular order, this should not be understood as requiring that such operations be performed in the particular order shown or in sequential order, or that all illustrated operations be performed, to achieve the desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

Suitable computer program code residing on a computer-readable medium may be provided for performing one or more functions in relation to performing the processes as described herein. The term "computer-readable medium" as used herein refers to any non-transitory or transitory medium that provides or participates in providing instructions to a processor of the computing device (e.g., the BLE device 106a-b, the receiving server 105, or any other processor of a device described herein) for execution. Such a medium may take many forms, including but not limited to non-volatile media and volatile media. Nonvolatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A method for cross-channel scheduling of high efficiency (HE) multi-user (MU) frame transmission, the method comprising:
    obtaining resource allocation information for a first channel of a plurality of channels, resource allocation information for a second channel of the plurality of channels, plurality of physical layer (PHY) configuration information for a first plurality of scheduled stations, and plurality of PHY configuration information for a second plurality of scheduled stations;
    determining a total bandwidth allocated for the first and the second plurality of scheduled stations, wherein the total bandwidth is divided among the plurality of channels;
    configuring a first preamble frame comprising a first common block and a first plurality of user blocks, wherein the first common block comprises the resource allocation information for the first channel and the first plurality of user blocks contains a first plurality of PHY configuration information of the respective plurality of PHY configuration information for the first plurality of scheduled stations scheduled on the first channel;
    configuring a first MU frame comprising the first preamble frame and a first data frame, wherein the first data frame is transmitted over the first channel of the plurality of channels;
    configuring a second preamble frame comprising a second common block and a second plurality of user blocks, wherein the second common block comprises the resource allocation information for the second channel and the second plurality of user blocks contains a second plurality of PHY configuration information of the respective plurality of PHY configuration information for the second plurality of scheduled stations scheduled on the second channel;
    configuring a second MU frame comprising the second preamble frame and a second data frame, wherein the second data frame is transmitted over the second channel of the plurality of channels; and
    transmitting, via the plurality of channels, the first MU frame and the second MU frame.

2. The method for cross-channel scheduling of HE MU frame transmission of claim 1, wherein the first plurality of scheduled stations and the second plurality of scheduled stations are not a same number of scheduled stations.

3. The method for cross-channel scheduling of HE MU frame transmission of claim 1, further comprising:
    determining whether the total bandwidth allocated for the plurality of scheduled stations is greater than a bandwidth occupied by two channels of the plurality of channels;
    in response to determining that the total bandwidth allocated for the plurality of scheduled stations is greater than a bandwidth occupied by two channels of the plurality of channels:
        modifying the configuration of the first preamble frame;
        modifying the configuration of the second preamble frame;
        configuring the first MU frame comprising the modified first preamble frame and the first data frame, wherein the first data frame is transmitted over the first channel;
        configuring the second MU frame comprising the modified second preamble frame and the second data frame, wherein the second data frame is transmitted over the second channel;
        configuring a third MU frame comprising the modified first preamble frame and a third data frame, wherein the third data frame is transmitted over a third channel of the plurality of channels;
        configuring a fourth MU frame comprising the modified second preamble frame and a fourth data frame, wherein the fourth data frame is transmitted over a fourth channel of the plurality of channels; and transmitting, via the plurality of channels, the first MU frame, the second MU frame, the third MU frame, and the fourth MU frame.

4. The method for cross-channel scheduling of HE MU frame transmission of claim 3, wherein modifying the configuration of the first preamble comprises:
   configuring the first common block to comprise the resource allocation information for the first channel and the third channel; and
   configuring the first plurality of user blocks to comprise the first plurality of PHY configuration information of the respective plurality of PHY configuration information, wherein the first plurality of PHY configuration information is for the first plurality of scheduled stations scheduled on the first channel and the second plurality of scheduled stations scheduled on the third channel.

5. The method for cross-channel scheduling of HE MU frame transmission of claim 3, wherein modifying the configuration of the first preamble comprises:
   configuring the second common block to comprise the resource allocation information for the second channel and the fourth channel; and
   configuring the second plurality of user blocks to comprise the second plurality of PHY configuration information of the respective plurality of PHY configuration information, wherein the second plurality of PHY configuration information is for a third plurality of scheduled stations scheduled on the second channel and a fourth plurality of scheduled stations scheduled on the fourth channel.

6. The method for cross-channel scheduling of HE MU frame transmission of claim 1, wherein each channel of the plurality of channels is allocated a same bandwidth.

7. The method for cross-channel scheduling of HE MU frame transmission of claim 6, wherein the same bandwidth is 20 MHz.

8. The method for cross-channel scheduling of HE MU frame transmission of claim 1, wherein the first common block is non-fully-duplicated.

9. A system for cross-channel scheduling of high efficiency (HE) multi-user (MU) frame transmission, the system comprising:
   control circuitry coupled to a transmitter, the control circuitry configured to:
     obtain resource allocation information for a first channel of a plurality of channels, resource allocation information for a second channel of the plurality of channels, plurality of physical layer (PHY) configuration information for a first plurality of scheduled stations, and plurality of PHY configuration information for a second plurality of scheduled stations;
     determine a total bandwidth allocated for the first and the second plurality of scheduled stations, wherein the total bandwidth is divided among the plurality of channels;
     configure a first preamble frame comprising a first common block and a first plurality of user blocks, wherein the first common block comprises the resource allocation information for the first channel and the first plurality of user blocks contains a first plurality of PHY configuration information of the respective plurality of the PHY configuration for the first plurality of scheduled stations scheduled on the first channel;
     configure a first MU frame comprising the first preamble frame and a first data frame, wherein the first data frame is transmitted over the first channel of the plurality of channels;
     configure a second preamble frame comprising a second common block and a second plurality of user blocks, wherein the second common block comprises the resource allocation information for the second channel and the second plurality of user blocks contains the second plurality of PHY configuration information of the respective plurality of the PHY configuration for the second plurality of scheduled stations scheduled on the second channel; and
     configure a second MU frame comprising the second preamble frame and a second data frame, wherein the second data frame is transmitted over the second channel of the plurality of channels; and
   the transmitter configured to:
     transmit, via the plurality of channels, the first MU frame and the second MU frame.

10. The system for cross-channel scheduling of HE MU frame transmission of claim 9, wherein the first plurality of scheduled stations and the second plurality of scheduled stations are not a same number of scheduled stations.

11. The system for cross-channel scheduling of HE MU frame transmission of claim 9, wherein the control circuitry is further configured to:
   determine whether the total bandwidth allocated for the plurality of scheduled stations is greater than a bandwidth occupied by two channels of the plurality of channels;
   in response to determining that the total bandwidth allocated for the plurality of scheduled stations is greater than a bandwidth occupied by two channels of the plurality of channels:
     modify the configuration of the first preamble frame;
     modify the configuration of the second preamble frame;
     configure the first MU frame comprising the modified first preamble frame and the first data frame, wherein the first data frame is transmitted over the first channel;
     configure the second MU frame comprising the modified second preamble frame and the second data frame, wherein the second data frame is transmitted over the second channel;
     configure a third MU frame comprising the modified first preamble frame and a third data frame, wherein the third data frame is transmitted over a third channel of the plurality of channels;
     configure a fourth MU frame comprising the modified second preamble frame and a fourth data frame, wherein the fourth data frame is transmitted over a fourth channel of the plurality of channels; and
     transmit, via the plurality of channels, the first MU frame, the second MU frame, the third MU frame, and the fourth MU frame.

12. The system for cross-channel scheduling of HE MU frame transmission of claim 11, wherein the control circuitry is configured to modify the configuration of the first preamble by:
   configuring the first common block to comprise the resource allocation information for the first channel and the third channel; and
   configuring the first plurality of user blocks to comprise the first plurality of PHY configuration information of the respective plurality of PHY configuration information, wherein the first plurality of PHY configuration information is for the first plurality of scheduled stations scheduled on the first channel and the second plurality of scheduled stations scheduled on the third channel.

13. The system for cross-channel scheduling of HE MU frame transmission of claim 11, wherein the control circuitry is configured to modify the configuration of the first preamble by:
   configuring the second common block to comprise the resource allocation information for the second channel and the fourth channel; and
   configuring the second plurality of user blocks to comprise the second plurality of PHY configuration information of the respective plurality of PHY configuration information, wherein the second plurality of PHY configuration information is for a third plurality of scheduled stations scheduled on the second channel and a fourth plurality of scheduled stations scheduled on the fourth channel.

14. The system for cross-channel scheduling of HE MU frame transmission of claim 9, wherein each channel of the plurality of channels is allocated a same bandwidth.

15. The system for cross-channel scheduling of HE MU frame transmission of claim 14, wherein the same bandwidth is 20 MHz.

16. The system for cross-channel scheduling of HE MU frame transmission of claim 9, wherein the first common block is non-fully-duplicated.

\* \* \* \* \*